United States Patent Office 2,721,875
Patented Oct. 25, 1955

2,721,875

METHOD FOR PREPARING AMINOMETHYL-SULFONIC ACIDS

Joseph J. Dickert, Jr., Westville, N. J., and Howard D. Hartough, Wilmington, Del., assignors to Socony Mobil Oil Company, Inc., a corporation of New York No Drawing. Application April 7, 1952,
Serial No. 281,048

9 Claims. (Cl. 260—456)

This invention relates to the preparation of aminoalkyl sulfonic acids and addition products of arylamines. It is more particularly concerned with the preparation of aminomethylsulfonic acid.

The aminoalkyl sulfonic acids are acids having the general formula,

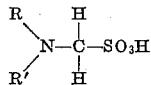

where R is hydrogen or an alkyl or an aryl group and R' is R, hydrogen, an alkyl group or an aryl group. The first member of the series or class, aminomethylsulfonic acid, $NH_2CH_2SO_3H$, was prepared first by Reinking, Dehnel and Labhardt in 1905 by the reaction at 70° C. of ammonia with the sodium bisulfite-formaldehyde complex, $CH_2OH \cdot NaSO_3$, followed by acidification to obtain the free acid, $NH_2CH_2SO_3H$ [Ber. 38, 1069–1080 (1905)] Backer and Mulder [Rec. Trav. Chim., 52, 454–468 (1933) and 53, 1120–1127 (1934)] prepared aminomethylsulfonic acid and a series of amines in a similar manner. These men also introduced a new method for preparing the first member of the series. This method may be represented by the following equations:

(A) $(NH_4)_2SO_3 + CH_2O \rightarrow NH_2CH_2SO_3NH_4 + H_2O$ (B) $NH_2CH_2SO_3NH_4 + H^+ \rightarrow NH_2CH_2SO_3H + NH_4^+$ The preparation of aminomethylsulfonic acid or some of its derivatives has been described in the following: Raschig, Ber., 59, 859–865 (1926); Schroeter, Ber., 66B, 1038 (1933); Rumpf, Comp. rend., 204, 592 (1937); Rumpf, Bull. Soc. Chim. [S] 5, 871–88 (1938).

The preparation of the oleylamide derivative is described in the U. S. Patent No. 2,313,695. In accordance with the process disclosed therein oleic acid amide and sodium formaldehyde-bisulfite or formaldehyde bisulfite are heated to a temperature at which the water evaporates and the heating continued until condensation is completed. The reaction is carried out at pressures not exceeding atmospheric and in the absence of diluents or catalysts. In U. S. Patent No. 2,388,316 it is disclosed that products similar to aminomethylsulfonic acid are useful for their solubilizing action on other ingredients, as preservatives, and to prevent sludge formation during the developing of photographic films.

It is to be noted that Walker, "Formaldehyde" [A. C. S. Monograph No. 98 (1944), page 117] makes the following statement:

"Formaldehyde reacts chemically with a wide variety of inorganic agents. Representative reactions are summarized in this chapter beginning with those involving the strongly electropositive elements and compounds (vis., alkalies, ammonia, and metals) and ending with those involving the electronegative mineral acids and halogens. This order has been followed because it emphasizes the fact that the chemical behavior of formaldehyde is determined to a very great extent by the polarity of the reactant or by the acidity or alkalinity of the reaction medium."

In view of this statement, it is surprising to find that the product which Backer and Mulder (supra) obtain by reacting formaldehyde solution, sodium bisulfite and ammonia can be obtained in increased yields by reacting formaldehyde solution, ammonia and sulfur dioxide. Accordingly, it is an object of the present invention to provide a means for producing materials corresponding to the general formula,

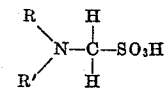

by reacting formaldehyde, a halide of ammonia or of a substituted ammonia or ammonia and sulfur dioxide.

In general, it has been found that aminomethylsulfonic acid can be prepared by three novel but related methods involving the use of sulfur dioxide. First, sulfur dioxide can be passed into a solution of ammonium hydroxide and formaldehyde; second, sulfur dioxide can be introduced into a solution containing ammonium halide and formaldehyde; and third, sulfur dioxide can be introduced into an aqueous solution of hexamethylenetetramine. In each case the aminomethylsulfonic acid is crystallized from the aqueous solution as a pure white crystalline compound in high yields. Hydrochloric acid is a contaminant in the second method and is removed by recrystallization or elutriation with water.

Derivatives of aminomethylsulfonic acid, i. e., the aminoalkyl sulfonic acids and addition products of arylamines and arylaminomethylsulfonic acids can be prepared by the same basic methods by the use of suitable types of substituted ammonias such as alkylamines, for example methyl- or ethyl-amine or other primary amines, or alkylene diamines such as ethylene diamine, propylene diamine, phenylene diamine or toluylene diamine, arylamines such as aniline and toluidine or aralkylamines such as benzylamines and xylylamine such as tolubenzylamine. Therefore, in general, the novel method for preparing aminomethylsulfonic acid and related compounds basically involves the reaction expressed by the following equation:

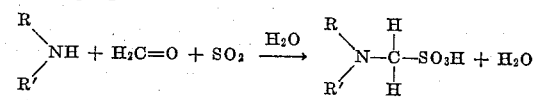

where R and R' are hydrogen, an alkyl group, an aryl group or an alkaryl group.

Illustrative of the three basic reactions involved are the following examples:

EXAMPLE I

About 2 moles of formaldehyde in the form of an aqueous 36 per cent solution thereof and about 1 mole of ammonium chloride were mixed, stirred and heated to 40° C. When the temperature of the mixture reached 40° C., a stream of sulfur dioxide was passed through the reaction mixture. Heating of the reaction mixture was continued until the temperature reached 78° C. The temperature was held substantially constant and the introduction of sulfur dioxide continued for about twenty minutes after which the source of external heat was removed and the mixture allowed to cool to ambient temperatures, i. e., 15–20° C. It was observed that about five minutes after the temperature of the reaction mixture reached 78° C. and the sulfur dioxide was introduced into the reaction mixture a white, crystalline solid began to separate from the reaction mixture. About 0.74 mole of aminomethylsulfonic acid was recovered.

EXAMPLE II

About 80 parts by weight of an aromatic petroleum fraction having a boiling range of 300° F. to 400° F. and having as its principal aromatic constituents trimethyl-benzenes, together with about 2 moles of formaldehyde as a 36 per cent aqueous solution and about 1 mole of ammonium chloride were mixed, agitated vigorously and heated to 50° C. When the temperature of the mixture reached 50° C., a stream of sulfur dioxide was passed into the mixture. Heating and the introduction of sulfur dioxide into the reaction mixture was continued until a total reaction time of thirty-five minutes had elapsed during which the temperature had remained constant at 80° C. ±1° C. Twenty minutes after the initial introduction of the sulfur dioxide a white, crystalline solid began to separate. The reaction mixture was allowed to cool to ambient temperatures and the crystalline material separated. About 0.58 mole of aminomethylsulfonic acid was recovered. The product melted at 182°–183° C., with decomposition. The composition of the product is compared with the calculated composition of aminomethylsulfonic acid as follows:

|  | Aminomethylsulfonic acid $NH_2CH_2SO_3H(CH_5NO_3S)$ | |
|---|---|---|
|  | Calculated | Found |
| Carbon percent | 10.72 | 11.20 |
| Hydrogen percent | 4.50 | 4.61 |
| Nitrogen percent | 12.61 | 12.23 |
| Sulfur percent | 28.82 | 28.29 |

EXAMPLE III

About 63 parts by weight of a concentrated aqueous solution of ammonium hydroxide (27 per cent $NH_3$) and about 83 parts by weight of an aqueous 36 per cent formaldehyde solution were mixed and agitated. A stream of sulfur dioxide was passed through the mixture for about thirty minutes. A white, crystalline solid formed and was filtered off and proven to be aminomethylsulfonic acid. About 82 parts by weight were recovered.

EXAMPLE IV

About 280 parts by weight of hexamethylenetetramine (about 2 moles), equivalent to 8 moles of ammonia ($NH_3$) and 12 moles of formaldehyde, and about 214 parts by weight of ammonium chloride (about 4 moles) were dissolved in about 3000 parts by weight of water and stirred rapidly. A stream of sulfur dioxide was bubbled in and the temperature of the reaction mixture allowed to rise to about 80° C. The temperature of the reaction mixture was maintained in the range 75° to 80° C. by means of external cooling until the temperature began to fall below 75° C. The mixture was then allowed to cool to ambient temperatures and the introduction of sulfur dioxide discontinued. The yield of aminomethylsulfonic acid was 867 parts by weight. It is to be observed that when an aqueous solution of hexamethylenetetramine is treated with sulfur dioxide under the same conditions of temperature and pressure some aminomethylsulfonic acid is formed but the yield is appreciably less than when ammonium halide is present.

EXAMPLE V

Equal volumes of 25 per cent aqueous solution of methylamine and 36 per cent aqueous solution of formaldehyde were mixed and sulfur dioxide introduced. A white, crystalline solid separated from the mixture. This product has a melting point of 166.5°–167.5° C. (with decomposition). The nitrogen and sulfur content of the product established that the composition justified the formula $C_2H_7NSO_3$ or $CH_3NHCH_2SO_3H$ in view of the melting point.

|  | For $C_2H_7NSO_3$ | |
|---|---|---|
|  | Calculated | Found |
| Nitrogen percent | 11.20 | 11.13 |
| Sulfur percent | 25.60 | 25.69 |

EXAMPLE VI

One part by volume of a 45 per cent aqueous solution of ammonium bisulfite and one part by volume of a 36 per cent aqueous solution of formaldehyde were mixed and the temperature maintained at about 65° C., by external cooling. Upon cooling to room temperature no crystals appeared. After seeding with crystals from an authentic sample of aminomethylsulfonic acid no crystals were formed. The reaction mixture was divided into two equal portions and 0.5 mole of concentrated hydrochloric acid was added to one portion. No aminomethylsulfonic acid formed.

EXAMPLE VII

About 134 parts by weight of $(NH_4)_2SO_3 \cdot H_2O$ (about 1 mole) was dissolved in about 135 parts by weight of water. About 1 mole of formaldehyde in the form of a 36 per cent aqueous solution was added. No heat of reaction was produced. About 3 moles of concentrated hydrochloric acid were added in three 1 mole portions. A precipitate formed after the addition of the third mole of acid but this was proven to be ammonium chloride.

EXAMPLE VIII

About 20 moles of ammonia as a 28.4 per cent aqueous solution of ammonium hydroxide was placed in a container and agitated vigorously whilst being cooled with an ice-bath. About 20 moles of formaldehyde as an aqueous 36 per cent formaldehyde solution was added slowly whilst maintaining the temperature of the resultant solution below 65° C. After the addition of the formaldehyde the mixture was cooled to 30° C. and a stream of sulfur dioxide was introduced into the mixture. The temperature of the reaction mixture was allowed to drop to 20° C. and the external cooling regulated to maintain a reaction temperature of 20° C. (±2°) for four hours. Thereafter the source of external cooling was removed and the temperature of the reaction mixture allowed to rise. At a temperature between about 45 and about 50° C. a solid began to form in the reaction mixture and the temperature of the reaction mixture was maintained between about 50° and 55° C. for an additional 1.5 hours. The reaction temperature then began to drop, the stream of gaseous sulfur dioxide was shut off and the reaction mixture was cooled to room temperature (15° to 25° C.).

The solid was separated from the reaction mixture and air dried. About 16.3 moles of aminomethylsulfonic acid (M. P. 179°–181° C.) were obtained after drying. This is equivalent to a yield of about 82 per cent of theoretical.

In contradistinction to the alkylamines, arylamines do not yield the simple aryl aminomethylsulfonic acids but an addition compound of the simple arylaminomethylsulfonic acid. Thus, when aniline, formaldehyde and sulfur dioxide are reacted under the conditions set forth hereinbefore a product is obtained which upon analysis justifies the empirical formula $C_{14}H_{16}N_2O_3S$; the compound $C_6H_5$—NH—$CH_2SO_3$—$CH_2$—NH—$C_6H_5$ likewise has the empirical formula $C_{14}H_{16}N_2O_3S$.

EXAMPLE IX

Eighty-four parts by weight of 36 per cent aqueous formaldehyde solution (about 1 mole) were diluted with about 100 parts by weight of water. The solution was agitated vigorously, immersed in an ice-bath and a stream of gaseous sulfur dioxide introduced for about one hour. Thereafter, about 93 parts by weight of aniline (about 1 mole) were added slowly at a rate such that the temperature of the reaction mixture did not rise above about 25° C. The resultant reaction mixture was stirred for about two hours more, the source of external cooling removed and the agitation continued for an additional three hours. At this time some crystalline material began to form. The agitation was stopped, the stream of sulfur dioxide shut off and the mixture allowed to stand for about sixteen hours at room temperature (15°–20° C.).

A large amount of crystalline solid formed in the reaction mixture during the period. It was separated from the reaction mixture and air-dried. After recrystallization from water the product melted at 154°–155° C. with decomposition.

Analysis of the product yielded the following results:

| | |
|---|---|
| Carbon per cent | 56.46 |
| Hydrogen per cent | 5.46 |
| Nitrogen per cent | 9.47 |
| Sulfur per cent | 10.8 |
| Oxygen per cent (by difference) | 17.81 |

From these values it can be calculated that the empirical formula of this product is $C_{14}H_{16}N_2O_3S$ which is valid for the product $C_6H_5$—NH—$CH_2$—$SO_3$—$CH_2$—NH—$C_6H_5$.

The observed values and the calculated values for $C_6H_5$—NH—$CH_2$—$SO_3$—$CH_2$—NH—$C_6H_5$ are as follows:

| | Calculated | Found |
|---|---|---|
| Carbon percent | 57.53 | 56.46 |
| Hydrogen percent | 5.48 | 5.46 |
| Nitrogen percent | 9.59 | 9.47 |
| Sulfur percent | 10.96 | 10.8 |

The preparation of aminomethylsulfonic acid, the preparation of methylaminomethylsulfonic acid and the preparation of the addition product of aniline and phenylaminomethylsulfonic acid as described hereinbefore establish that the novel methods disclosed herein are suitable for the preparation of the class of sulfonic acids denominated amino-organosulfonic acids having the general formula $RR'NCH_2SO_3H$ in which R and R' are hydrogen, an alkyl group, an aryl group or an alkaryl group. The foregoing illustrative, but not limiting, examples establish that the novel method of preparation comprises reacting sulfur dioxide, an aldehyde and one of the group consisting of ammonia and substituted ammonias in dilute aqueous acid solution.

As will be apparent from the foregoing, the acidic conditions required in the process of this invention can be effected in several ways. In general, the dilute acidic solution is achieved by the use of excessive amounts of sulfur dioxide to overcome any basicity induced by the presence of amines or ammonia. Such an acid solution can be formed in other ways however. Thus, as demonstrated in Example IV, ammonium chloride, which hydrolyzes to form dilute hydrochloric acid, can be used. Naturally, when ammonium chloride alone is used as the amino reactant (Examples I and II), acidic conditions are achieved by the hydrolysis reaction.

This application is a continuation-in-part of copending application, Serial Number 64,706, filed December 10, 1948, now abandoned, by the same inventors involved in this application.

What is claimed is:

1. A method for preparing an aminomethylsulfonic acid type compound, which comprises reacting, in dilute aqueous acidic medium, sulfur dioxide and an amino compound-aldehyde combination selected from the group consisting of (1) ammonia and formaldehyde, (2) hexamethylenetetramine, (3) an ammonium chloride and formaldehyde, (4) a lower alkyl amine containing labile hydrogen and formaldehyde, and (5) an aryl amine containing labile hydrogen and formaldehyde, at a temperature varying between about 15° C. and about 80° C.

2. A method for preparing aminomethylsulfonic acid, which comprises reacting sulfur dioxide, and ammonium halide and formaldehyde in a molar excess.

3. A method for preparing aminomethylsulfonic acid, which comprises reacting sulfur dioxide with ammonium chloride and formaldehyde in a molar proportion of said ammonium chloride to said formaldehyde of about 1:2, and at a temperature of about 80° C.

4. A process for preparing aminomethylsulfonic acid, which comprises reacting, in dilute aqueous acidic solution, sulfur dioxide and hexamethylenetetramine.

5. A method for preparing aminomethylsulfonic acid, which comprises reacting sulfur dioxide with hexamethylenetetramine and ammonium chloride.

6. A method for preparing aminomethylsulfonic acid, which comprises reacting, in dilute aqueous acidic solution, sulfur dioxide, and ammonia and formaldehyde in a molar proportion of about 1:1.

7. A method for preparing N-methylaminomethylsulfonic acid, which comprises reacting, in dilute aqueous acidic solution, sulfur dioxide, methyl amine, and formaldehyde.

8. A method for preparing bis-(arylaminomethyl)sulfonate, which comprises reacting, in dilute aqueous acidic medium, sulfur dioxide, and aryl amine containing labile hydrogen, and formaldehyde, in a molar proportion of said aryl amine and said formaldehyde of about 1:1, at a temperature varying between about 15° C. and about 25° C.

9. A method for preparing bis-(phenylaminomethyl)-sulfonate, which comprises reacting, in dilute aqueous acidic medium, sulfur dioxide, aniline, and formaldehyde, in a molar proportion of said aniline to said formaldehyde of about 1:1, at a temperature varying between about 15° C. and about 25° C.

References Cited in the file of this patent

UNITED STATES PATENTS

| | | |
|---|---|---|
| 2,373,298 | Dougherty et al. | Apr. 10, 1945 |
| 2,461,463 | Anish | Feb. 8, 1949 |
| 2,503,280 | Lockwood | Apr. 11, 1950 |
| 2,547,906 | Fincke | Apr. 3, 1951 |

OTHER REFERENCES

Beilstein, "Handbuch der Organischen Chemie," 4th ed., vol. 12, p. 184 (1929).